US011429644B2

(12) United States Patent
Dardia et al.

(10) Patent No.: US 11,429,644 B2
(45) Date of Patent: Aug. 30, 2022

(54) SYSTEMS AND METHODS FOR COMPUTER MODELING USING INCOMPLETE DATA

(71) Applicant: Insurance Services Office, Inc., Jersey City, NJ (US)

(72) Inventors: Kristen Dardia, Jersey City, NJ (US); Tracey Waller, Montclair, NJ (US); Ekampreet Singh, San Jose, CA (US); Irina Matijosaitiene, New York, NY (US); Frederick Stoll, New Providence, NJ (US)

(73) Assignee: Insurance Services Office, Inc., Jersey City, NJ (US)

( * ) Notice: Subject to any disclaimer, the term of this patent is extended or adjusted under 35 U.S.C. 154(b) by 0 days.

(21) Appl. No.: 17/222,292

(22) Filed: Apr. 5, 2021

(65) Prior Publication Data

US 2021/0311967 A1    Oct. 7, 2021

Related U.S. Application Data

(60) Provisional application No. 63/004,697, filed on Apr. 3, 2020.

(51) Int. Cl.
| | | |
|---|---|---|
| *G06F 16/28* | (2019.01) | |
| *G06F 16/23* | (2019.01) | |
| *G06K 9/62* | (2022.01) | |

(52) U.S. Cl.
CPC ........ *G06F 16/285* (2019.01); *G06F 16/2365* (2019.01); *G06K 9/6298* (2013.01)

(58) Field of Classification Search
CPC ........................... G06F 16/285; G06F 16/2365
(Continued)

(56) References Cited

U.S. PATENT DOCUMENTS

| 8,694,540 B1* | 4/2014 | Lin ...................... G06F 16/211 |
| | | 707/777 |
| 2007/0112697 A1* | 5/2007 | Ricketts ................ G06F 16/283 |
| | | 706/12 |

(Continued)

OTHER PUBLICATIONS

Zarnetske, et al., "Habitat Classification Modeling with Incomplete Data: Pushing the Habitat Envelope," Ecological Applications, 17(6), 2007 by Ecological Society of America (13 pages).

(Continued)

*Primary Examiner* — James Trujillo
*Assistant Examiner* — Fariborz Khoshnoodi
(74) *Attorney, Agent, or Firm* — McCarter & English, LLP (57) ABSTRACT

Systems and methods for dynamic computer modeling using incomplete data are provided. The system can yield a total score indicative of an accuracy and reliability of a model for a given application based on incomplete data. The system can receive one or more sets of datasets, classify each dataset among the set of datasets based on a classification component, and determine a normalized score for each dataset based on a value or values of each dataset. If a classification component does not comprise more than one dataset, then the system determines a classification component score for each dataset as the normalized score. If a classification component comprises more than one dataset, the system assigns a weighted data value to each dataset of the classification component. A classification component score is determined for each weighed dataset by applying the weighted data value to the normalized score for each weighed dataset. A final component score for each dataset is determined by applying a weighted classification component value to the classification component score for each dataset. If the system determines that there is not an incomplete or missing dataset among the set of datasets, the system deter- (Continued)

mines the total score by aggregating the final component scores for each complete dataset. If the system determines that there is at least one incomplete or missing dataset among the set of datasets, the system determines a final component score for each incomplete or missing dataset and determines the total score by aggregating the final component scores for each complete dataset and the final component scores for each incomplete or missing dataset.

18 Claims, 9 Drawing Sheets

(58) Field of Classification Search
USPC .................................................. 707/737
See application file for complete search history.

(56) References Cited

U.S. PATENT DOCUMENTS

| 2010/0106724 | A1* | 4/2010 | Anderson | G06N 20/00 707/E17.046 |
| 2011/0184896 | A1 | 7/2011 | Guyon | |
| 2012/0004893 | A1 | 1/2012 | Vaidyanathan et al. | |
| 2012/0011115 | A1* | 1/2012 | Madhavan | G06F 16/951 707/723 |
| 2014/0108352 | A1* | 4/2014 | Ahrens | G06F 11/1451 707/645 |
| 2015/0100943 | A1 | 4/2015 | Gabel et al. | |
| 2017/0249434 | A1* | 8/2017 | Brunner | G06F 16/3334 |
| 2017/0270056 | A1* | 9/2017 | Chung | G06F 12/1009 |
| 2019/0340533 | A1* | 11/2019 | Copper | G06N 3/088 |
| 2019/0347118 | A1* | 11/2019 | Mukherjee | G06F 16/90332 |
| 2019/0361849 | A1* | 11/2019 | Rogynskyy | G06F 7/14 |
| 2020/0004834 | A1 | 1/2020 | Sadeddin et al. | |

OTHER PUBLICATIONS

International Search Report of the International Searching Authority datted Jul. 12, 2021, issued in connection with International Application No. PCT/US2021/025747 (4 pages).

Written Opinion of the International Searching Authority dated Jul. 12, 2021, issued in connection with International Application No. PCT/US2021/025747 (5 pages).

* cited by examiner

Learning

- For source, *S* in DataSources, *D*
  - For Record, *R* in *S*
    - *Scores_S.append(Size,CalculateScore(R))*
  - *Curve_Size = fit(Score_S.get(Size))*
  - *Curve_S.append(Size,Curve_Size)*
- *Curve_D.append(S,Curve_S)*

Assignment

- Given a no-hit for DataSource, $S^n$, for record $R^n$.
- *Scores_hit = {$S^1,S^2,S^3$...}*
- Score_Average = avg(Scores_hit)
- *Curve = Curve_D.get($S^n$).get(Size_$R^n$)*
- *Score_$S^n$* = argmax(Curve[neighborhood(Score_Average)])
- *Error_$S^n$* = 1 − Curve[neighborhood(Score_Average)]

SYSTEMS AND METHODS FOR COMPUTER MODELING USING INCOMPLETE DATA

RELATED APPLICATIONS

The present application claims the priority of U.S. Provisional Application Ser. No. 63/004,697 filed on Apr. 3, 2020, the entire disclosure of which is incorporated herein by reference.

BACKGROUND

Technical Field

The present disclosure relates generally to the field of computer modeling. More particularly, the present disclosure relates to systems and methods for dynamic computer modeling using incomplete data.

Related Art

The field of computer modeling has become increasingly important for a variety of applications including, but not limited to, atmospheric, economic and insurance applications. For example, computer modeling systems are widely utilized for weather and risk forecasting. However, these systems have drawbacks, such as an inability to solve for the complexities and challenges associated with forecasting when necessary data cannot be located, is missing, or is inconsistently formatted. This may result in an inaccurate or an incomplete model. As such, the ability to generate an accurate and complete model using incomplete data is a powerful tool.

Thus, in view of the existing technology in this field, what would be desirable is a system that automatically and efficiently processes incomplete data, regardless of the data source, to automatically generate an accurate and complete model for a variety of applications. Accordingly, the systems and methods disclosed herein solve these and other needs.

SUMMARY

The present disclosure relates to a system for dynamic computer modeling using incomplete data. In particular, the system can yield a total score indicative of an accuracy and reliability of a model for a given application based on incomplete data. The system can receive one or more sets of datasets via an application programming interface (API) or a static file. The system can classify each dataset among the set of datasets based on a classification component and determine a normalized score for each dataset based on a value or values of each dataset. If a classification component does not comprise more than one dataset, then the system determines a classification component score for each dataset as the normalized score. Alternatively, if a classification component comprises more than one dataset, then the system assigns a weighted data value to each dataset of the classification component. The system can determine a classification component score for each weighed dataset by applying the weighted data value to the normalized score for each weighed dataset. The system can determine a final component score for each dataset by applying a weighted classification component value to the classification component score for each dataset. If the system determines that there is not an incomplete or missing dataset among the set of datasets, then the system determines the total score by aggregating the final component scores for each complete dataset. Alternatively, if the system determines that there is at least one incomplete or missing dataset among the set of datasets, then the system determines a final component score for each incomplete or missing dataset and determines the total score by aggregating the final component scores for each complete dataset and the final component scores for each incomplete or missing dataset.

BRIEF DESCRIPTION OF THE DRAWINGS

The foregoing features of the invention will be apparent from the following Detailed Description of the Invention, taken in connection with the accompanying drawings, in which.

DETAILED DESCRIPTION

The present disclosure relates to systems and methods for dynamic computer modeling using incomplete data, as described in detail below in connection with FIGS. 1-8.

Figure 1:
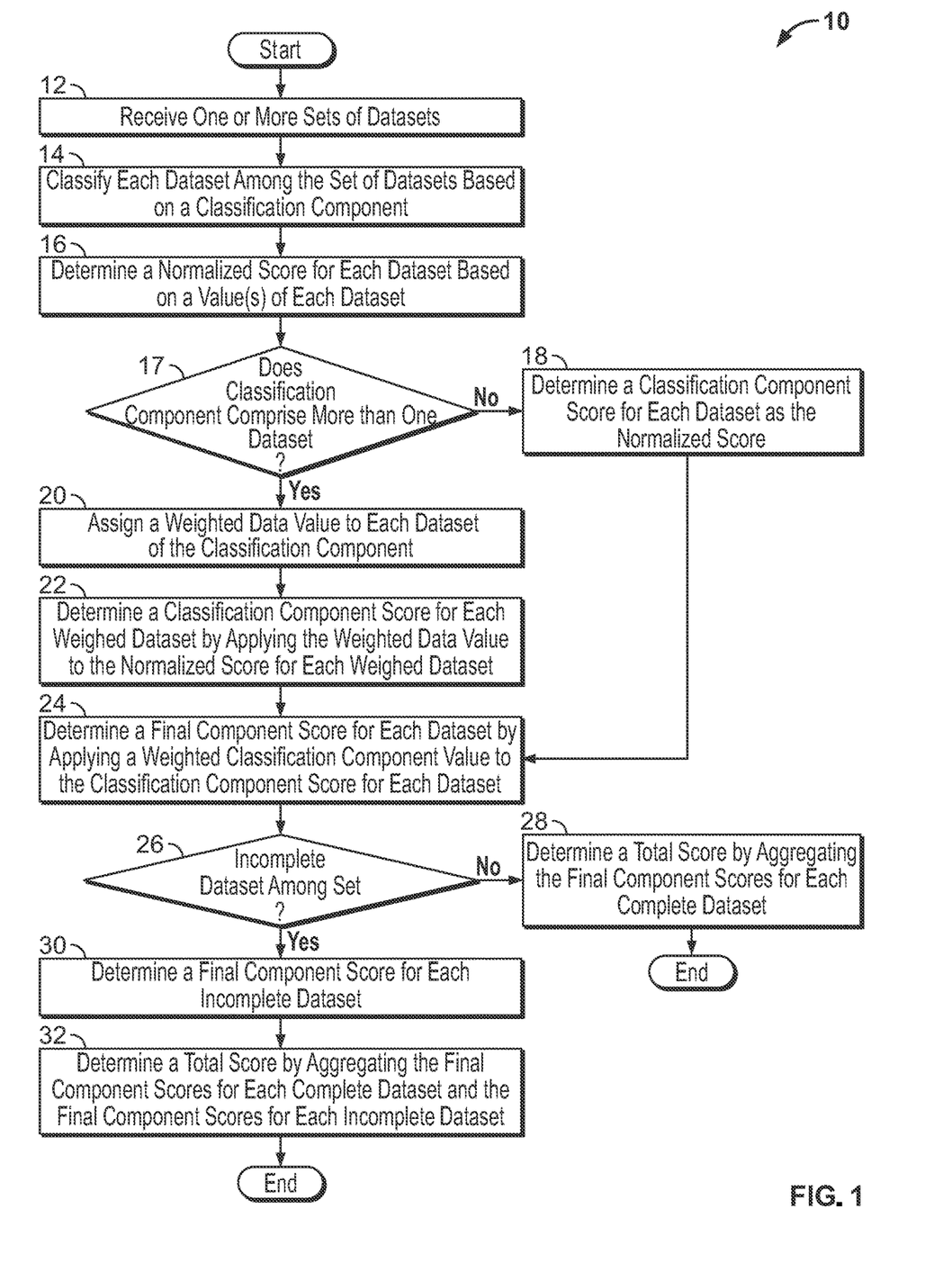
FIG. 1 is a flowchart illustrating overall process steps carried out by the system of the present disclosure.

FIG. 1 is a flowchart illustrating the overall process steps 10 carried out by the system of the present disclosure. Beginning in step 12, the system receives one or more sets of datasets. In particular, the system receives the datasets based on one or more input files, direct user input, or via an application programming interface (API) or a static file. In step 14, the system classifies each dataset among the set of datasets based on a classification component. A classification component is indicative of a relevant and important metric associated with the input and may comprise one or more datasets. For example classification components for a geospatial dataset could include precipitation, air pressure, and temperature components. In another example, classification components for a stock ticker symbol could include yield, P/E ratio, and market cap components. In yet another example, classification components for a business name and address could include business maturity, financial stability indicators, business infractions, health and safety violations, client feedback, and training standards.

In step 16, the system determines a normalized score for each dataset based on a value or values of each dataset. In step 17, the system determines whether a classification component comprises more than one dataset. If a classification component does not comprise more than one dataset, then the system determines a classification component score for each dataset as the normalized score in step 18. The system then proceeds to step 24. Alternatively, if a classification component comprises more than one dataset, then the system assigns a weighted data value to each dataset of the classification component in step 20. Next, in step 22, the system determines a classification component score for each weighed dataset by applying the weighted data value to the normalized score for each weighed dataset. In step 24, the system determines a final component score for each dataset by applying a weighted classification component value to the classification component score for each dataset.

In step 26, the system determines whether an incomplete dataset exists among the set of datasets, or if a dataset is missing from the set of datasets. If the system determines that there is not an incomplete or missing dataset among the set of datasets, then in step 28 the system determines a total score by aggregating the final component scores for each complete dataset and the process ends. The total score is indicative of an accuracy and reliability of a model for a given application. The total score can range from 0 to 100 where 0 is indicative of the lowest score and 100 is indicative of the highest score. Alternatively, if the system determines that there is at least one incomplete or missing dataset among the set of datasets, then the system determines a final component score for each incomplete or missing dataset in step 30. Lastly, in step 32, the system determines a total score by aggregating the final component scores for each complete dataset and the final component scores for each incomplete or missing dataset.

Figure 2:
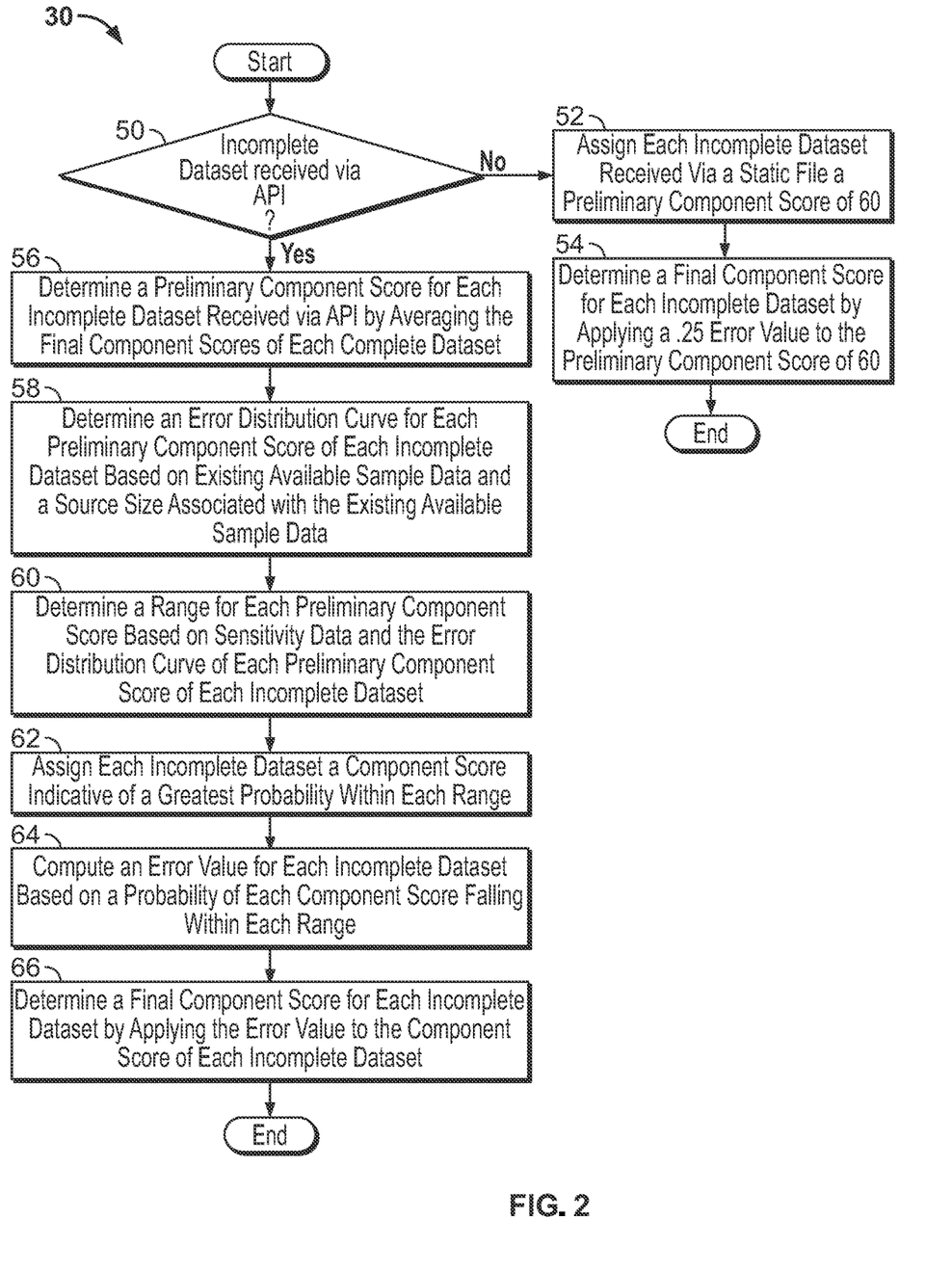
FIG. 2 is a flowchart illustrating step 30 of FIG. 1 in greater detail.

FIG. 2 is a flowchart illustrating step 30 of FIG. 1 in greater detail. The system can receive datasets via various mechanisms including, but not limited to, an API, direct user input, or one or more static file. Beginning in step 50, the system determines whether the incomplete or missing dataset was received by the system via an API. If an incomplete or missing dataset was not received via an API, then in step 52 the system assigns each incomplete or missing dataset received via a static file a preliminary component score of 60. Then, in step 54, the system determines a final component score for each incomplete or missing dataset by applying a 0.25 error value to each preliminary component score of 60 and the process ends. Alternatively, if an incomplete dataset is received via an API, then the system determines a preliminary component score in step 56 for each incomplete or missing dataset received via the API by averaging the final component scores of each complete dataset.

In step 58, the system determines an error distribution curve for each preliminary component score of each incomplete or missing dataset based on existing available sample data and a source size associated with the existing available sample data. Then in step 60, the system determines a range for each preliminary component score based on sensitivity data and the error distribution curve of each preliminary component score of each incomplete or missing dataset. In step 62, the system assigns each incomplete or missing dataset a component score indicative of a greatest probability within each determined range. Then, in step 64, the system computes an error value for each incomplete or missing dataset based on a maximum absolute probability of each component score falling within each range. Lastly, in step 66, the system determines a final component score for each incomplete or missing dataset by applying the respective error value to the component score of each incomplete or missing dataset.

Figure 3:
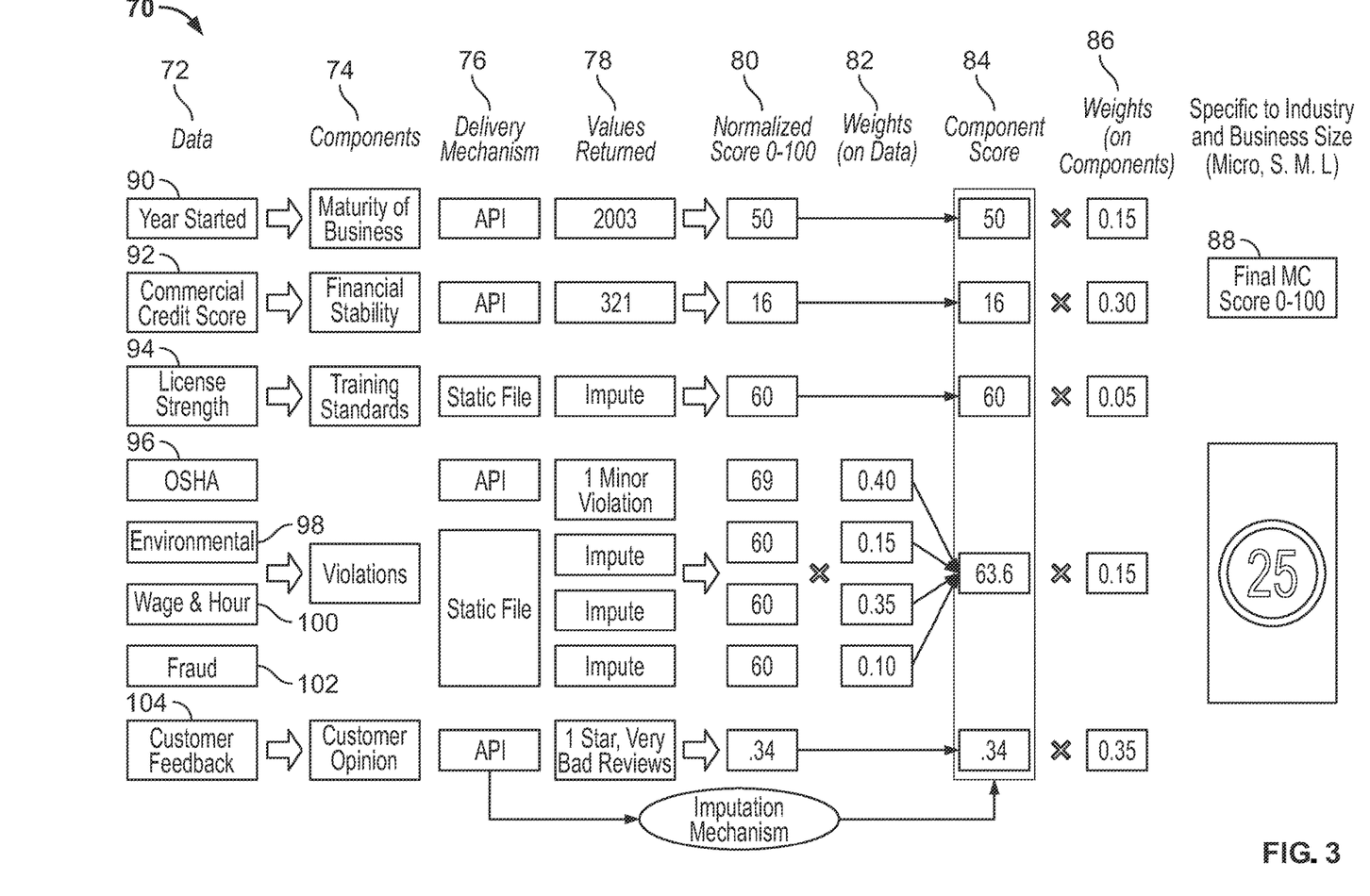
FIG. 3 is a diagram illustrating an example application of the system of the present disclosure.

FIG. 3 is a diagram 70 illustrating an example application of the system of the present disclosure. As noted above, the system of the present disclosure can be utilized for a variety of applications. By way of example, FIG. 3 illustrates utilizing the system of the present disclosure to solve for the complexities and challenges associated with determining how well a given business is managed (i.e., management competency) in commercial insurance underwriting when necessary data is missing. It is noted that the processing steps discussed above in connection with FIGS. 1-2 could be applied to perform dynamic computer modeling of management competency of a business, even in the presence of missing or incomplete data.

By way of background, management competency is a pivotal factor in selecting and pricing an insurance policy as it can greatly impact the chance that a business will suffer an insurable loss or be subject to lawsuits by clients or other businesses. Underwriters and insurance producers must consider several data sources including, but not limited to, business maturity, financial stability indicators, business infractions, health and safety violations, client feedback, and training standards in determining the management competency of a particular business.

Determining management competency presents several challenges including, but not limited to, data collection, inconsistent data formatting, underwriter data evaluation inconsistencies, missing data, and time. With respect to data collection, there is no specific data source and/or data point that an underwriter can rely upon that is indicative of management competency. Rather, an assessment of management competency is based upon several different factors from many different data sources. Therefore, after receiving an application, an underwriter must gather as much data as possible concerning risk exposure. For example, an underwriter may conduct research on different platforms or systems, websites and files to gather the data. Occasionally, an underwriter will receive a portion of the data from an insurance producer via the application packet but the received data is often unverified and/or incomplete.

Additionally, the received data is often formatted inconsistently which can cause delays in automated or manual underwriting processes. For example, during a manual underwriting process, an underwriter must reconcile and make sense of disparate data before making a determination. Further, the significant number of data sources increases the likelihood of mistakenly overlooking necessary data. Also, if errors are discovered, additional work product is required to resolve the errors and any associated issues stemming therefrom.

Underwriter data evaluation inconsistences can also impact underwriting. Currently, underwriters perform a portion of the complex analysis necessary to determine management competency by relying on their judgment, experience and expertise. Accordingly, the underwriting process can be subjective and can result in two different underwriters arriving at inconsistent decisions regarding a level of management competency based on the same data.

Missing data or inaccurate data can also present several challenges to determining management competency. Data that is critical to assessing management competency is often missing or of questionable accuracy or currency. This can be particularly true with respect to small or new businesses as there is generally less data available.

In addition, data may be missing for several reasons and it is often not possible to ascertain the particular reason for which the data is missing. For example, in an automated underwriting process, a system matching algorithm may be unable to find data associated with a business when the data does in fact exist but cannot be located. This could yield several consequences including, but not limited to, an inaccurate assessment of the business' management competency, an insurer accepting a risk outside of its appetite, underpricing the risk, and subpar reinsurance decisions. For example, a business could have several serious Occupational Safety and Health Administration (OSHA) violations but if the system is unable to find these violations or is unable to match the business name with the specific OSHA violation record, then the data would be omitted from the underwriter's evaluation thereby yielding an inaccurate assessment of the business' management competency. In this case, the inaccurate assessment could result in the associated risk of the potential insured to appear less than the actual risk. Accordingly, an insurer could accept risk that is outside its appetite or not undertake steps with such an insured to ensure an appropriate amount of loss control and mitigation that a business with serious OSHA violations should implement. Additionally, the likelihood of the risk being underpriced is increased. Further, loss reserves could likely be less than if the insurer had all the necessary data such that, when extrapolated over a portfolio of similarly situated businesses, the insurer could have significantly inadequate premium and loss reserves. Consequently, a portfolio comprised of risks based on inaccurate management competency assessments could result in subpar reinsurance decisions.

In the aforementioned example, there is also a possibility that when encountering missing data, an underwriter could elect a more risk-adverse approach and overcorrect by assigning a higher and unwarranted level of risk to the applicant. This in turn could lead to overpricing a policy which could negatively impact the insurer and the insured. For example, the insured could accept the policy and overpay or the insured could decline the policy and the insurer would lose business that it could have acquired if priced appropriately.

In another example, a large industrial business could have a minor OSHA violation but the expectation is that the business should have more than one violation and/or a more serious violation given its size and industry. As such, if the system is unable to find the minor violation or is unable to match the business name with the specific OSHA violation record, this could result in an inflated view of the insured's risk because, relative to the expectation, the business should receive underwriting credit. However, due to the inability to find the minor violation, an underwriter could assume that there is no data but had an OSHA violation occurred, it would have been worse than in actuality. Additionally, it is possible that data is missing because an OSHA inspection was not conducted at the business, but had an inspection occurred, violations would have been assessed which would have negatively impacted the management competency assessment. Alternatively, it is possible that an OSHA inspection was not conducted at the business, but had an inspection occurred, violations would not have been assessed which would have positively impacted the management competency assessment. However, it is unlikely that an underwriter can ascertain which of these scenarios is the reason for the missing data.

Further complications are apparent when considering the frequency with which data can be missing. Underwriters may vary approaches between under-considering and over-correcting, even between similar risks. Additionally, more than one dataset may be missing at a given time which compounds the issues. As such, under-considering and over-correcting could occur on a single risk.

Time and its associated cost with researching data relating to management competency can also present a challenge. Researching business maturity, financial stability indicators, business infractions, health and safety violations, client feedback, and training standards may require several hours if the information is not readily available or even several days if an underwriter engages a producer and/or an applicant in locating the data. However, even after a prolonged period of research, it may be possible that some critical data may be missing or may have been overlooked. Consequently, underwriters and producers may simply abandon a management competency assessment if data research and data collection searches remain fruitless or drag on resulting in potentially missing significant risk exposures.

Gathering critical data can result in additional costs for insurance carriers and approaches for accounting for missing data are subjective and likely to vary from underwriter to underwriter. Referring back to FIG. 3, the application of the system of the present disclosure to determining management competency in commercial insurance underwriting standardizes the management competency determination process via a compilation of various predictive and quality data sources and algorithmic quantification. Further, the system yields an overall score indicative of management competency. Importantly, the system also resolves the problem of subjective and inconsistent approaches for accounting for missing data and provides a means for considering risk while minimizing under-correcting or overcorrecting.

Figure 7:
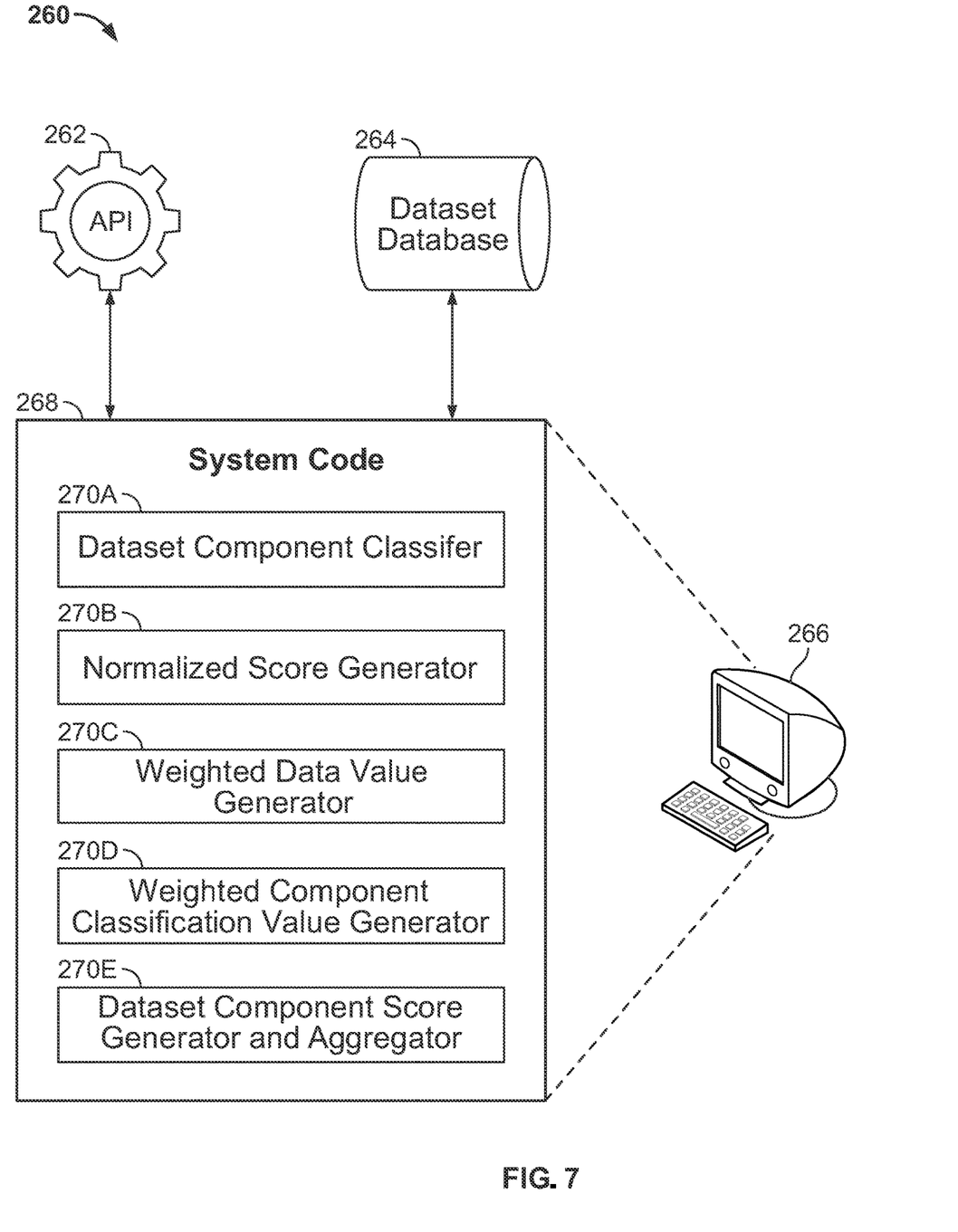
FIG. 7 is a diagram illustrating hardware and software components capable of being utilized to implement the system of the present disclosure.

As shown in FIG. 3, the system (indicated generally at 70) can receive various data 72 based on a user input such as a business name and address. The system performs a hierarchical search query to determine whether the data 72 is available within a dataset database 264 (as shown in FIG. 7). The data 72 can include datasets such as, but not limited to, a year the business started 90, a commercial credit score 92, a license strength 94, OSHA violation(s) 96, environmental violation(s) 98, wage and hour violation(s) 100, fraud 102, and customer feedback 104. Priority is given to datasets that include verified business information. The datasets 90-104 are classified by components 74 including, but not limited to, maturity (age) of the business, financial stability indicators, professional and occupational training standards, OSHA and business-related violations and customer opinion. It is noted that components 74 can comprise more than one dataset (e.g., OSHA and business-related violations). The final management competency score 88 is based on a total of the respective scores of the components 74. The final management competency score 88 can range from 0 to 100 where 0 is indicative of the lowest score and 100 is indicative of the highest score. Once the business is matched within the dataset database 264, the various datasets are called via a delivery mechanism 76 such as an API or a flat ("static") file. If there are results in the databases specific to the business then that data is returned.

Given the heterogeneity of the datasets and components 74, several different values 78 can be returned such as numerical and categorical values. In view of the diversity of values 78 that are returned, each of the values 78 is normalized via a normalized score 80 that accounts for a risk's peer group as defined by business industry and size. Business industry can be defined by a two-digit North American Industry Classification System (NAICS) code and business size is defined by a number of employees and comprises four categories (e.g., micro, small, medium and large).

A component score 84 for each dataset 90-104 is returned based on each dataset normalized score 80. However, when a component 74 comprises more than one dataset, each dataset comprising the component 74 is assigned a weighted data value 82. Then the component score 84 for the component 74 comprising more than one dataset is determined by applying the weighted data value to the normalized score 80 for each weighed dataset. For example, the OSHA and business-related violations component 74 comprises the OSHA violation(s) dataset 96, the environmental violation(s) dataset 98, the wage and hour violation dataset 100, and the fraud dataset 102. Therefore, each one of the datasets 96-102 is assigned a respective weighted data value 82. Accordingly, the component score 84 of the OSHA and business-related violations component 74 is the sum of the respective normalized scores 80 of the datasets 96-102 multiplied by the respective weighted data values 82 of the datasets 96-102.

Each component score 84 is then assigned a weight 86 with respect to their importance in determining management competency. The assigned weights 86 are specific to the business industry and size where the sum of all the weights 86 is equal to 1.0. As discussed above, the weights 86 can vary by industry as defined by the two digit NAICS code as well as by a size of the business as defined by the number of employees (e.g., micro, small, medium, and large). For example, a small business classified by NAICS code 23 for "Construction" will have a different weight scheme than a medium-sized business classified by the same NAICS code 23 for "Construction." In addition, a medium sized business classified by NAICS code 33 for "Manufacturing" will have a different weight scheme than a same sized business classified by the NAICS code 23 for "Construction." As discussed above, some components 74 may comprise more than one dataset. The datasets of such a component 74 are weighted with respect to their importance to the overall component 74 via a weighted data value 82.

The sum of the respective component scores 84 multiplied by their respective weights 86 yields the final management competency score 88. The final management competency score 88 can range from 0 to 100 where 0 is indicative of the lowest score and 100 is indicative of the highest score. It is noted that to return a final management competency score 88, a minimum of the business maturity financial stability indicators components 74 and the NAICS code must be available. The final management competency score 88 can be used in underwriting to quantify the quality of a business' management as it pertains to insurance risk and can be delivered to an underwriter or producer at a point of quote. The final management competency score 88 can also be used to determine eligibility of a given risk with respect to an appetite of an insurer, for general risk quality assessment, for schedule rating justification, to provide guidance related to limit/deductible offerings and for risk tiering.

Figure 4A:
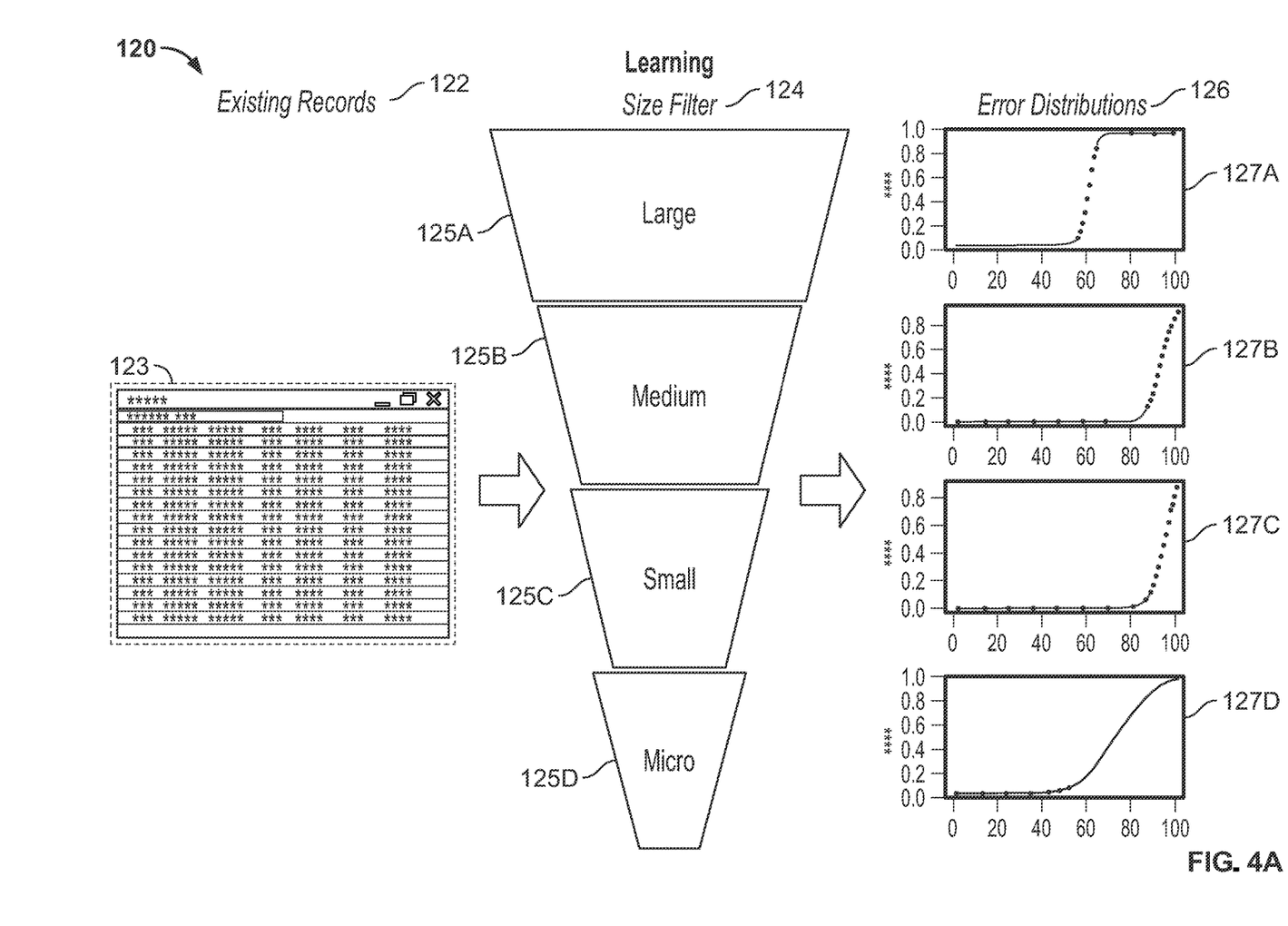
FIG. 4A is a diagram illustrating process steps carried out by the system of the present disclosure to determine an error distribution curve for a preliminary component score of an incomplete or missing dataset.

FIG. 4A is a diagram 120 illustrating process steps carried out by the system of the present disclosure to determine an error distribution curve for a preliminary component score of an incomplete or missing dataset. In particular, FIG. 4A illustrates a machine learning process utilized by the system to determine a trend for different business types to apply a preliminary component score for an incomplete or missing dataset. Firstly, when a component dataset is incomplete or a component dataset is missing (or any non-required data that is provided via API), the system averages the final component scores of each complete dataset to determine a preliminary component score for the incomplete or missing component dataset. However, as discussed above, this approach alone would be insufficient to solve for the various reasons that a component dataset could be incomplete or missing and the subsequent impact that each may have on the management competency assessment. Therefore, error distribution curves 126 are generated and an error is applied.

The error distribution curves 126 are empirical probability density functions based on existing records 122 indicative of a number of businesses that were assigned a particular component score and a business size filter 124. The error distribution curves 127a-127d are respectively generated for each business size (e.g., micro, small, medium and large) filter 125a-125d and illustrate a probability that a business of a given size will have a particular component score. As such, there is an error distribution curve 126 for every possible combination of datasets and business size. The error addresses the unknown reason for the incomplete or missing component dataset by tempering instances where standard or typical imputation would lead to a drastic score for the incomplete or missing component dataset because other component scores may be drastic. In particular, the error tempers the preliminary component score closer to 50 (the expectation) by reducing the weight given to the incomplete or missing component dataset. Generally, this is analogous to solving for an underwriter under-correcting or overcorrecting based on an assessment of at least one incomplete or missing component dataset.

Figure 4B:
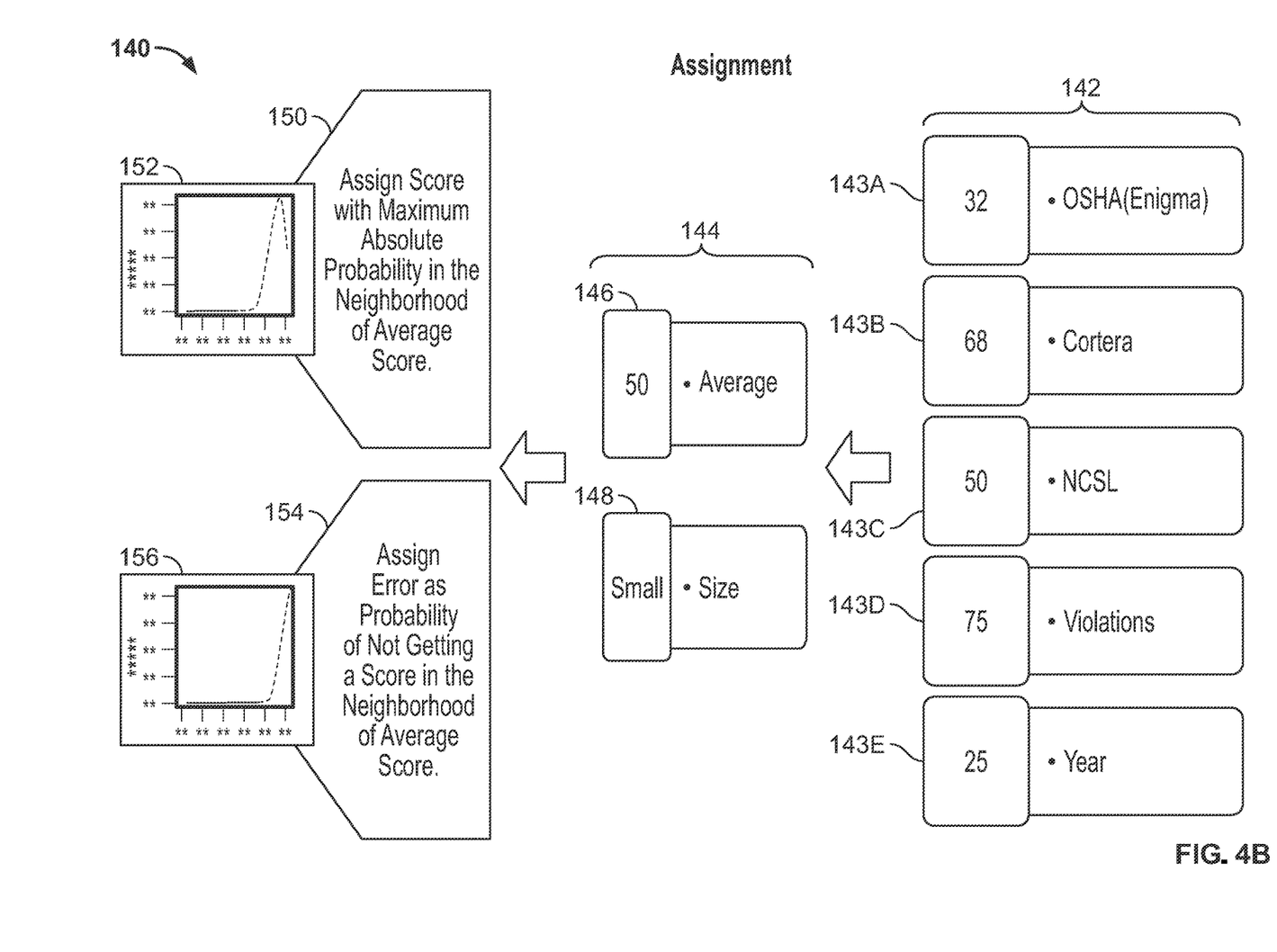
FIG. 4B is a diagram illustrating process steps carried out by the system of the present disclosure to assign an incomplete or missing dataset a component score and compute an error value for the assigned component score.

FIG. 4B is a diagram 140 illustrating process steps carried out by the system of the present disclosure to assign an incomplete or missing component dataset a component score and compute an error value for the assigned component score. In particular, FIG. 4B illustrates an assignment process utilized by the system for the selection and application of the error to the preliminary component score to determine a final component score for an incomplete or missing component dataset. As discussed above, the system averages the final component scores 142 of each complete dataset 143a-143e to determine a preliminary component score 146 for the incomplete or missing component dataset 144. The system also determines a size 148 of the business for the incomplete or missing component dataset 144. As shown in FIG. 4B, the incomplete or missing component dataset 144 has a preliminary component score of 50 and a small business size.

Then, based on the error distribution curve 152 (indicative of the preliminary component score 146 and business size 148 of the incomplete or missing component dataset 144 and sensitivity data), the system determines a preliminary component score range (e.g., within +/−3 points of the preliminary component score 146) for the incomplete or missing component dataset 144. The system assigns the incomplete or missing component dataset 144 a component score 150 indicative of a maximum absolute probability within the determined preliminary component score range. For example, if a preliminary component score is 55, then a preliminary component score range would be 52-58. If, within the range, the maximum absolute probability is associated with a score of 57 then the component score would be 57. The error 154 is applied to the component score 150 to calculate the final component score. In particular, the error 154 is equal to 1 minus the probability of the component score 150 not falling within the range. The final component score is then weighted based on its industry and size.

It is noted that the aforementioned machine learning and assignment processes respectively illustrated in FIGS. 4A and 4B are not ideal for static datasets. As such, the system employs a different score assignment method for incomplete or missing static datasets. In particular, the system assigns a preliminary component score of 60 to the incomplete or missing dataset to avoid negatively impacting the business for the missing data (i.e., overcorrecting) without applying undue positive consideration. An error of 0.25 is then applied to the preliminary component score of 60 to determine the final component score.

Figure 5A:
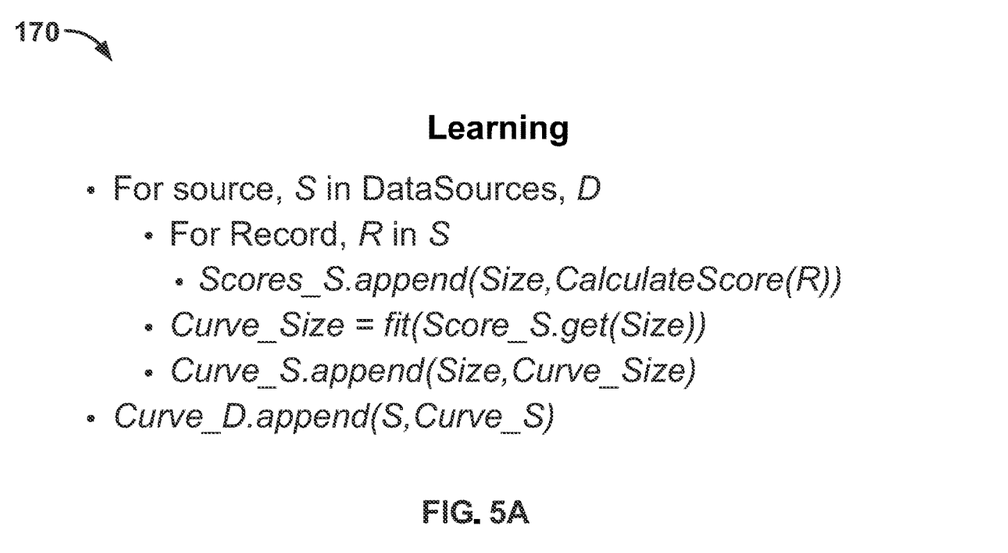
FIG. 5A is a diagram illustrating pseudocode for determining an error distribution curve for a preliminary component score of an incomplete or missing dataset.

FIG. 5A is a diagram 170 illustrating pseudocode for determining an error distribution curve for a preliminary component score of an incomplete or missing dataset. In the pseudocode, source S is indicative of the aggregated dataset of all values in a missing component dataset, D is indicative of all data sources for which a component score has been calculated, and R is indicative of the record for which a value is being imputed in source S (i.e., the business whose management competency score is being determined). For R in S, Scores_S comprises a map having four keys (e.g., one for each business size of micro, small, medium and large) and the value for each key is a collection of all the available scores based on the size of the business. A curve is fit for each key and each of the curves is appended to Curve_S which is also based on business size. Lastly, all Curves_S that have been calculated for each of the different businesses are appended to Curve_D which yields a hierarchical structure (i.e., the empirical probability density functions).

Figure 5B:
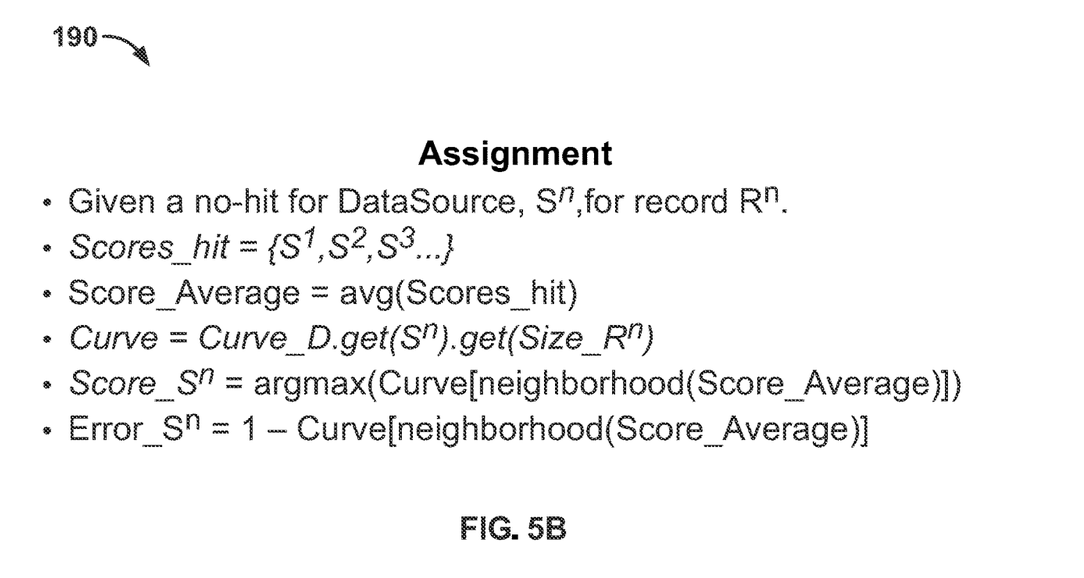
FIG. 5B is a diagram illustrating pseudocode for assigning an incomplete or missing dataset a component score and computing an error value for the assigned component score.

FIG. 5B is a diagram 190 illustrating pseudocode for assigning an incomplete or missing dataset a component score and computing an error value for the assigned component score. With respect to an assignment of a component score, it is given that data is unavailable for the record $R''$ in the data source $S''$. For the scores ($S^1$, $S^2$, $S^3$ . . . ) for which data is available (Scores_hit), the average of those scores is calculated to yield the Score_Average (i.e., the preliminary component score). The appropriate Curve is the Curve within all the data sources having keys with $S''$ and the size Size_$R''$ of the business whose management competency is being assessed. Next, the component score Score_$S''$ is calculated by finding an optimal value argmax or a highest probability score in a range (e.g., within +/−3 points of the preliminary component score) of the preliminary component score. The appropriate error Error_$S''$ to be applied to the highest probability score in the range is 1 minus the probability of the range scores.

Figure 6:
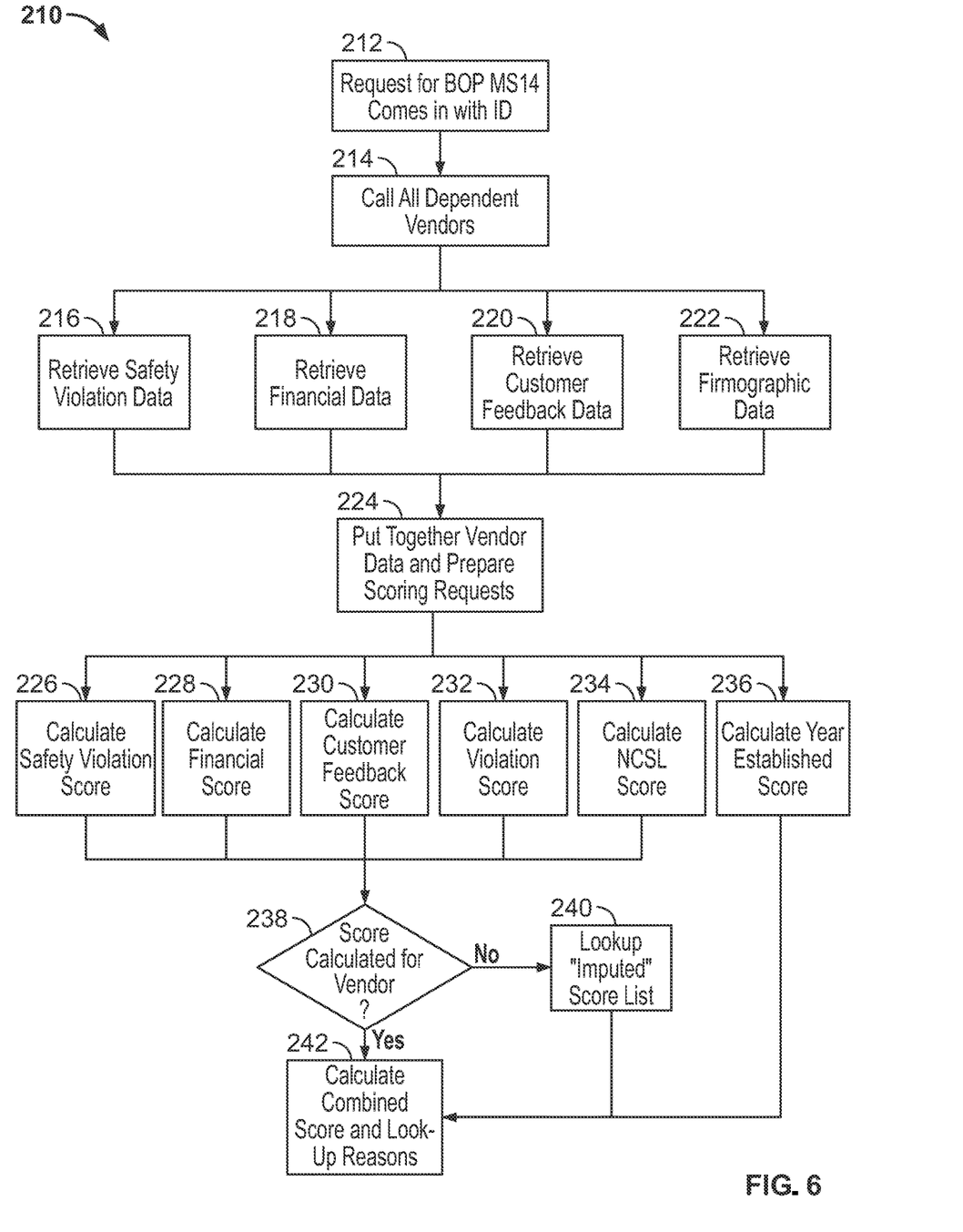
FIG. 6 is a flowchart illustrating overall process steps of an example application of an embodiment of the system of the present disclosure.

FIG. 6 is a flowchart 210 illustrating process steps of an example application of the system of the present disclosure. In particular, FIG. 6 illustrates utilizing the system of the present disclosure to determine management competency in commercial insurance underwriting when necessary data is missing. Beginning in step 212, the system receives a request from an insurance carrier or a producer via a Business Owners Policy (BOP) API with an instruction to determine a management competency score for a business. In step 214, the system calls data sources such as dependent vendors providing data such as, but not limited to, safety violation data, financial data, customer feedback data and firmographic data that may have datasets relevant to the business. Then, in steps 216-222, the system retrieves the respective vendor datasets and in step 224 the system compiles the vendor datasets and prepares normalized scores for each component dataset. Next, in steps 226-236, the system calculates a component score for each vendor dataset in addition to other components extrapolated therefrom (e.g., the violation component, the NCSL component and the maturity component) based on a weighted component value indicative of an industry and size of the business. In step 238, the system determines whether a component score has been calculated for each vendor dataset. If a component score has been calculated for each vendor dataset, then the system sums the component scores to determine the final management competency score in step 242. Alternatively, if a component score has not been calculated for at least one vendor dataset because a dataset is incomplete or missing, then the system invokes the learning and assignment processes discussed above to calculate a component score for the incomplete or missing dataset in step 240. Subsequently, the system determines the final management competency score in step 242 by aggregating the final component scores for each complete dataset and the final component scores for each incomplete or missing dataset.

FIG. 7 is a diagram illustrating hardware and software components capable of being utilized to implement the system 260 of the present disclosure. The system 260 could be embodied as a central processing unit 266 (e.g., a hardware processor) coupled to an API 262 and/or a dataset database 264. The hardware processor could include, but is not limited to, a personal computer, a laptop computer, a tablet computer, a smart telephone, a server, and/or a cloud-based computing platform.

The system 260 includes system code 268 (i.e., non-transitory, computer-readable instructions) stored on a computer-readable medium and executable by the hardware processor or one or more computer systems. The code 268 could include various custom-written software modules that carry out the steps/processes discussed herein, and could include, but is not limited to, a dataset component classifier 270a, a normalized score generator 270b, a weighted data value generator 270c, a weighted component classification value generator 270d, and a dataset component score generator and aggregator 270e. The code 268 could be programmed using any suitable programming languages including, but not limited to, C, C++, C#, Java, Python or any other suitable language. Additionally, the code 268 could be distributed across multiple computer systems in communication with each other over a communications network, and/or stored and executed on a cloud computing platform and remotely accessed by a computer system in communication with the cloud platform. The code 268 could communicate with the API 262 and/or the dataset database 264, which could be stored on the same computer system as the code 268, or on one or more other computer systems in communication with the code 268.

Still further, the system 260 could be embodied as a customized hardware component such as a field-programmable gate array ("FPGA"), application-specific integrated circuit ("ASIC"), embedded system, or other customized hardware component without departing from the spirit or scope of the present disclosure. It should be understood that FIG. 7 is only one potential configuration, and the system of the present disclosure can be implemented using a number of different configurations.

Figure 8:
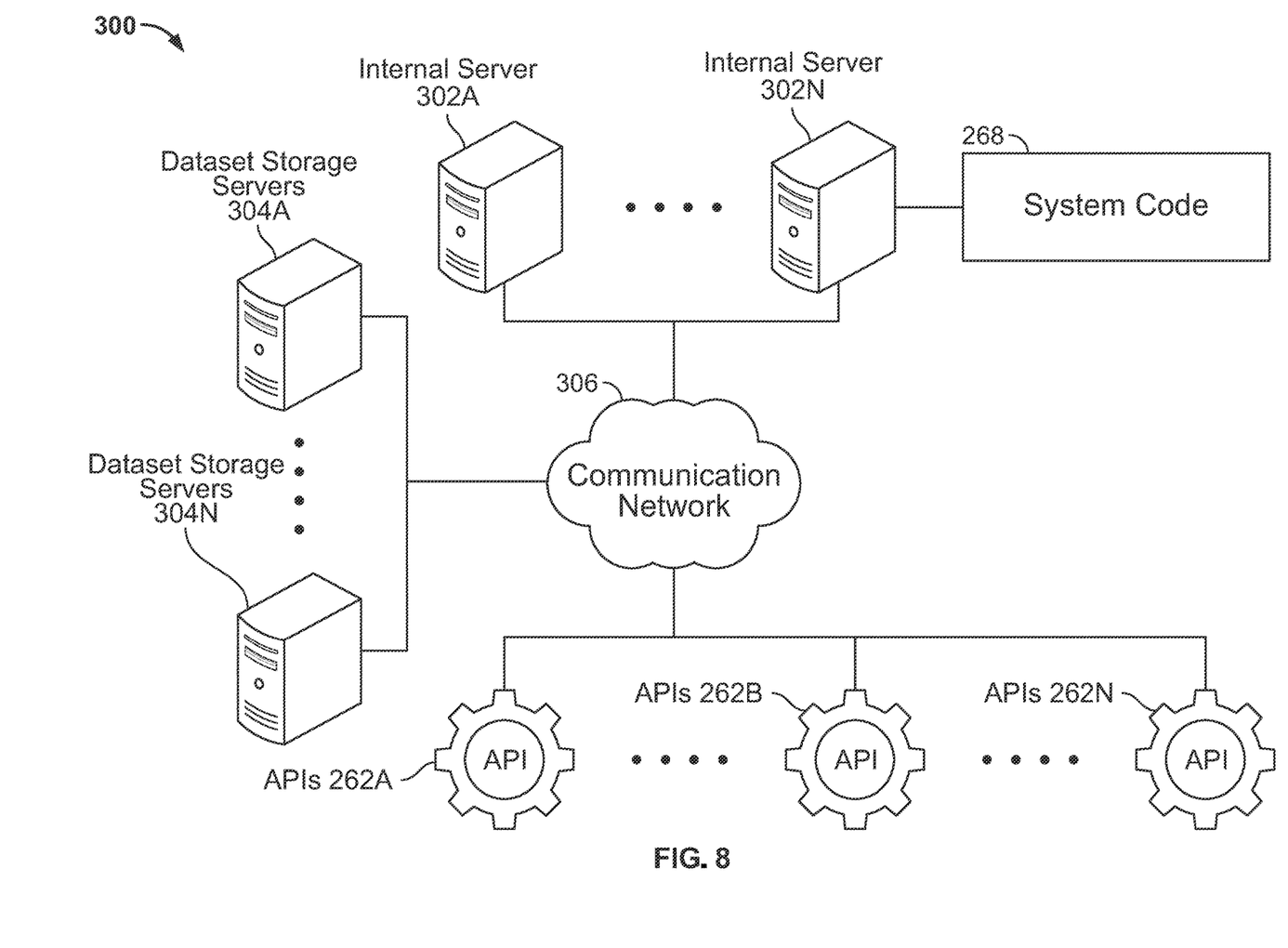
FIG. 8 is a diagram illustrating an embodiment of the system of the present disclosure.

FIG. 8 is a diagram 300 illustrating an embodiment of the system 260 of the present disclosure. In particular, FIG. 8 illustrates computer hardware and network components on which the system 260 could be implemented. The system 260 can include a plurality of internal servers 302a-302n having at least one processor and memory for executing the computer instructions and methods described above (which could be embodied as system code 268). The system 260 can also include a plurality of dataset storage servers 304a-304n for storing datasets. The system 260 can also include a plurality of APIs 262a-262n for receiving datasets from third party vendors and applications. The internal servers 302a-

302n, the dataset storage servers 304a-304n, and the APIs 262a-262n can communicate over a communication network 306. Of course, the system 260 need not be implemented on multiple devices, and indeed, the system 260 could be implemented on a single computer system (e.g., a personal computer, server, mobile computer, smart phone, etc.) without departing from the spirit or scope of the present disclosure.

In an absence of the systems and methods of the present disclosure, a central processing unit would require access to several different systems or websites and need to reconcile data being returned in multiple different formats including, but not limited to, XML, JSON, Microsoft Word, Microsoft Excel, PDF, or any format in which data might be stored in a local database. Additionally, the central processing unit would then need to normalize the data and execute the necessary calculations which could require hours of time. In contrast, the system of the present disclosure can access a variety of data sources, normalize the returned data thereof, process the normalized data, and execute necessary calculations in approximately two seconds to yield significant processing efficiencies. Indeed, in the absence of the systems/methods of the present disclosure, significant computing time and resources on the order of hours would be required to collect data from disparate data sources, enhance the data, perform queries on the data, and model the data, even using powerful machines with access to significant Internet bandwidth capabilities. However, due to the features of the present systems/methods disclosed herein, such processing time is significantly reduced.

Having thus described the system and method in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure. All such variations and modifications, including those discussed above, are intended to be included within the scope of the disclosure. What is desired to be protected by Letters Patent is set forth in the following claims.

What is claimed is:

1. A system for dynamic computer modeling using incomplete data, comprising:
    a processor in communication with a database; and
    machine-readable system code executed by the processor, the code causing the processor to:
        receive a plurality of datasets from the database, at least one of the plurality of datasets including incomplete data;
        process each of the plurality of datasets to classify each dataset based on a classification component;
        determine a normalized score for each dataset based on at least one value in each dataset;
        determine a classification component score for each dataset;
        determine a total score for the plurality of datasets by aggregating the classification component scores, the total score indicating accuracy and reliability of a model corresponding to the plurality of datasets;
        transmitting the total score to a recipient;
        determine whether an incomplete data set exists among the plurality of datasets;
        determine the final component score for each incomplete data set if an incomplete data set exists in the plurality of data sets; and
        determine whether the incomplete data set is received via an application programming interface (API).

2. The system of claim 1, wherein the code causes the processor to determine whether a classification component comprises more than one dataset.

3. The system of claim 2, wherein the code causes the processor to determine the classification component score for each of the datasets as the normalized score for each dataset if the classification component does not comprise more than one dataset.

4. The system of claim 2, wherein the code causes the processor to assign a weighted data value to each dataset of the classification component if the classification component comprises more than one dataset.

5. The system of claim 4, wherein the code causes the processor to determine the classification component score for each weighted dataset by applying the weighted data value to the normalized score for each weighted dataset.

6. The system of claim 1, wherein, if the incomplete data set is not received via the API, the code causes the processor to assign each incomplete data set received via a static file a fixed preliminary component score and determine a final component score for each incomplete data set by applying a fixed error value to the preliminary component score.

7. The system of claim 1, wherein, if the incomplete data set is received via the API, the code causes the processor to:
    determine a preliminary component score for each incomplete data set received by the API by averaging the final component scores of each complete data set;
    determine an error distribution curve for each preliminary component score of each incomplete data set based on existing available sample data and a score size associated with the existing available sample data;
    determine a range for each preliminary component score based on sensitivity data and the error distribution curve of each preliminary component score of each incomplete dataset;
    assign each incomplete data set a component score indicative of a greatest probability within each range;
    compute an error value for each incomplete data set based on a probability of each component score falling within each range; and
    determine a final component score for each incomplete dataset by applying the error value to the component score of each incomplete dataset.

8. The system of claim 1, wherein the code causes the processor to determine the total score by aggregating the final components cores for each complete data set and the final component scores for each incomplete data set.

9. The system of claim 1, wherein the code causes the processor to determine the total score by aggregating the final component scores for each complete data set in the plurality of data sets if an incomplete data set does not exist in the plurality of data sets.

10. A method for dynamic computer modeling using incomplete data, comprising the steps of:
    receiving at a processor a plurality of datasets from the database, at least one of the plurality of datasets including incomplete data;
    process each of the plurality of datasets by the processor to classify each dataset based on a classification component;
    determine by the processor a normalized score for each dataset based on at least one value in each dataset;
    determine by the processor a classification component score for each dataset;

determine by the processor a total score for the plurality of datasets by aggregating the classification component scores, the total score indicating accuracy and reliability of a model corresponding to the plurality of datasets;

transmitting the total score to a recipient;

determining by the processor whether an incomplete data set exists among the plurality of datasets;

determining by the processor the final component score for each incomplete data set if an incomplete data set exists in the plurality of data sets; and determining by the processor whether the incomplete data set is received via an application programming interface (API).

11. The method of claim 10, further comprising determining by the processor whether a classification component comprises more than one dataset.

12. The method of claim 10, further comprising determining by the processor the classification component score for each of the datasets as the normalized score for each dataset if the classification component does not comprise more than one dataset.

13. The method of claim 10, further comprising assigning by the processor a weighted data value to each dataset of the classification component if the classification component comprises more than one dataset.

14. The method of claim 13, further comprising determining by the processor the classification component score for each weighted dataset by applying the weighted data value to the normalized score for each weighted dataset.

15. The method of claim 10, wherein, if the incomplete data set is not received via the API, assigning by the processor each incomplete data set received via a static file a fixed preliminary component score and determining by the processor a final component score for each incomplete data set by applying a fixed error value to the preliminary component score.

16. The method of claim 10, wherein, if the incomplete data set is received via the API, the performing the steps by the processor of:

determining a preliminary component score for each incomplete data set received by the API by averaging the final component scores of each complete data set;

determining an error distribution curve for each preliminary component score of each incomplete data set based on existing available sample data and a score size associated with the existing available sample data;

determining a range for each preliminary component score based on sensitivity data and the error distribution curve of each preliminary component score of each incomplete dataset;

assigning each incomplete data set a component score indicative of a greatest probability within each range;

computing an error value for each incomplete data set based on a probability of each component score falling within each range; and determining a final component score for each incomplete dataset by applying the error value to the component score of each incomplete dataset.

17. The method of claim 10, further comprising determining by the processor the total score by aggregating the final components cores for each complete data set and the final component scores for each incomplete data set.

18. The method of claim 10, further comprising determining by the processor the total score by aggregating the final component scores for each complete data set in the plurality of data sets if an incomplete data set does not exist in the plurality of data sets.

* * * * *

UNITED STATES PATENT AND TRADEMARK OFFICE
CERTIFICATE OF CORRECTION

| | |
|---|---|
| PATENT NO. | : 11,429,644 B2 |
| APPLICATION NO. | : 17/222292 |
| DATED | : August 30, 2022 |
| INVENTOR(S) | : Kristen Dardia et al. |

It is certified that error appears in the above-identified patent and that said Letters Patent is hereby corrected as shown below:

In the Claims

In Column 12, Line 49, Claim 8, the word "cores" should be deleted and replaced with the word "scores"

In Column 14, Line 27, Claim 17, the word "cores" should be deleted and replaced with the word "scores"

Signed and Sealed this
Sixteenth Day of May, 2023

Katherine Kelly Vidal
*Director of the United States Patent and Trademark Office*